United States Patent [19]

Pei-gi et al.

[11] Patent Number: 5,009,388
[45] Date of Patent: Apr. 23, 1991

[54] MAGNETIC-CONTROLLED VALVE FOR FLUID PIPELINES

[76] Inventors: Mao Pei-gi, Porder Metallurgy Factory Nan-Ning; Gan Jing, Block 28, Room 207, Nan-Ning, Jiang Nan Road, both of Guangxi Zhuang Autonomous Region, China; Que Bing-huang, 2/f, Flat A, Kum On BLdg., No. 3, Station Lane, Hung Hom, Kowloon, Hong Kong

[21] Appl. No.: 432,482

[22] Filed: Nov. 7, 1989

[30] Foreign Application Priority Data

Jan. 6, 1989 [CN] China .................. 89 103861

[51] Int. Cl.$^5$ .................. F16K 31/08; F16K 5/00
[52] U.S. Cl. .................. 251/65; 251/160; 251/175; 251/192; 251/306
[58] Field of Search .................. 251/65, 160, 175, 192, 251/306

[56] References Cited

U.S. PATENT DOCUMENTS

| | | | |
|---|---|---|---|
| 2,629,401 | 2/1953 | Miller | 251/65 X |
| 2,675,024 | 4/1954 | Clark | 251/175 X |
| 3,206,159 | 9/1965 | Anderson et al. | 251/65 X |
| 3,837,616 | 9/1974 | Castriota-Scanderbeg | 251/306 X |

FOREIGN PATENT DOCUMENTS

| | | |
|---|---|---|
| 209051 | 11/1986 | China . |
| 105761 | 8/1987 | China . |
| 503293 | 7/1930 | Fed. Rep. of Germany ...... 251/175 |
| 895163 | 5/1962 | United Kingdom ................ 251/306 |

*Primary Examiner*—Gerald A. Michalsky
*Attorney, Agent, or Firm*—Flehr, Hohbach, Test, Albritton & Herbert

[57] ABSTRACT

A magnetic-controlled valve for fluid pipelines. The valve comprises a sealed guide bushing accommodating an external magnetic ring movable along the outer wall thereof and an internal magnetic plug-stopper movable longitudinally therein. A valve body accommodates one or more stages of a valve plunger, and the internal magnetic plug-stopper is aligned and engaged with the plunger. Lifting the external magnetic ring will lift the internal magnetic plug-stopper through a magnetic force, thus lifting the plunger to open the fluid passage of the valve body. This forms a magnetic-controlled stop valve. In an alternate configuration, an external magnetic ring is rotated to rotate the internal magnetic ring (blocks) to bring a butterfly type valve plate into rotary motion through a connecting rod. The rod is provided with a stopper element connected to the internal magnetic ring, thus forming a magnetic-controlled butterfly valve.

3 Claims, 3 Drawing Sheets

MAGNETIC-CONTROLLED VALVE FOR FLUID PIPELINES

This invention relates to a valve for fluid pipelines, more particularly to a magnetic-controlled valve used therefor.

There are many types of valves existing, the manipulation of which conventionally being controlled mechanically through outward links. The use of washers and packing makes such valves more susceptible to wear, corrosion, slip, and leakage. The problems associated with such valves include strenuous manipulation, low operating speed, frequent maintenance, short operation life, and high cost. Among the known art, permanent magnets have not been used for controlling valves for fluid pipelines.

This invention is a further improvement over the devices described in Utility Model Patent CN86209051, entitled "Magnet-Controlled Tap", issued to MAO PEI QI and GAN JING, and the patent application for invention CN87105761, entitled "Magnet-Controlled Valve", filed by GAN JING and MAO PEI QI. These devices are only viable for pipelines of small dimensions. The present invention removes the internal magnetic armature pusher rod (pin) used in the above-mentioned devices, thus simplifying processing and expanding the scope of application.

Moreover, valves of extra large diameters can be built which have proved to be satisfactory in low pressure, medium pressure and high pressure applications.

It is the object of the present invention to provide a novel magnetic-controlled valve for fluid pipelines, which possesses no outward mechanical link, being thoroughly sealed, easy to manipulate, of high operating speed, and introducing no wear and thus requiring little or no maintenance.

The subject matter of the present invention lies in the utilization of the magnetic force of permanent magnets to achieve thoroughly sealed valve control. This eliminates the need for an outward mechanical link, thus effecting no leakage and no wear. An external magnetic ring or block and an internal magnetic plug, which is used as a pusher as well as a stopper, are used in place of the operating wheel and the threaded bolt, reducing the overall dimensions and complexity of processing, and eliminating the transmission means and sealing packing, thus reducing the cost. The use of a plunger in place of a valvular element conforms the operating force to the fluid pressure, without effecting internal leakage, reducing the likelihood of damage and reducing the operating force. The operating knob of rectilinear motion is used in place of the operating wheel of helical motion, thus effecting a short travel path, high operating speed, easy manipulation, and adaptability to automatic control.

The invention will be further described with respect to the embodiments in conjunction with the accompanying drawings wherein.

Figure 1:
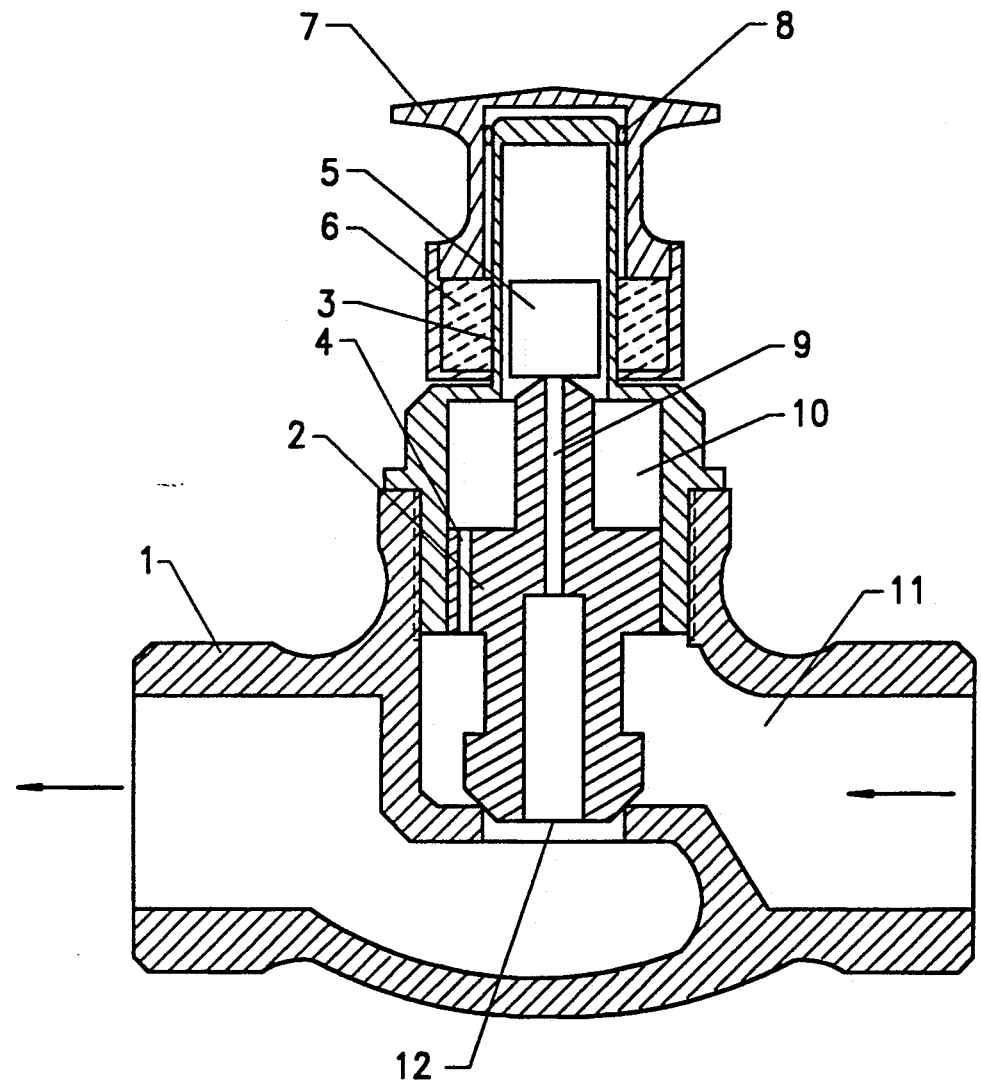
FIG. 1 is a schematic drawing of a small size stop valve according to the present invention.

FIG. 1 shows a small size stop valve in the closed position. When the valve is to be opened, the operating knob 7, provided with an external magnetic ring 6, should be lifted upwards. The magnetic force of the external magnetic ring attracts the internal magnet plug 5 in the sealed guide bushing 3 causing it to move upwards and exposing the pressure relief aperture 9 of the plunger 2. This allows the fluid in the back pressure area 10 to be discharged through the pressure relief aperture 9. The pressure intensity of the back pressure area 10 then becomes smaller than that of the positive pressure area 11, so the plunger 2 is subjected to the thrust of the positive pressure and moves upwards, opening the fluid passage 12 of the valve body 1. The higher the operating knob 7 is lifted, the larger will be the opening of the fluid passage 12, and the larger is the flow rate of the fluid.

When the valve is to be closed, the operating knob should be pressed downwards to effect the downward motion of the internal magnet plug 5, closing the pressure relief aperture 9 in the plunger 2. The fluid flows through the back pressure aperture or gap 4 near or on the periphery of the plunger 2 into the back pressure area 10 and establishes a back pressure therein. The plunger 2 is subjected to the downward thrust of the back pressure which overcomes the upward thrust of the flowing fluid and moves downwards to close the fluid passage 12. The stopper ring 8 is provided to control the positioning of the flow rate and to prevent the operating knob from passing beyond the sealed guide bushing 3.

Figure 2:
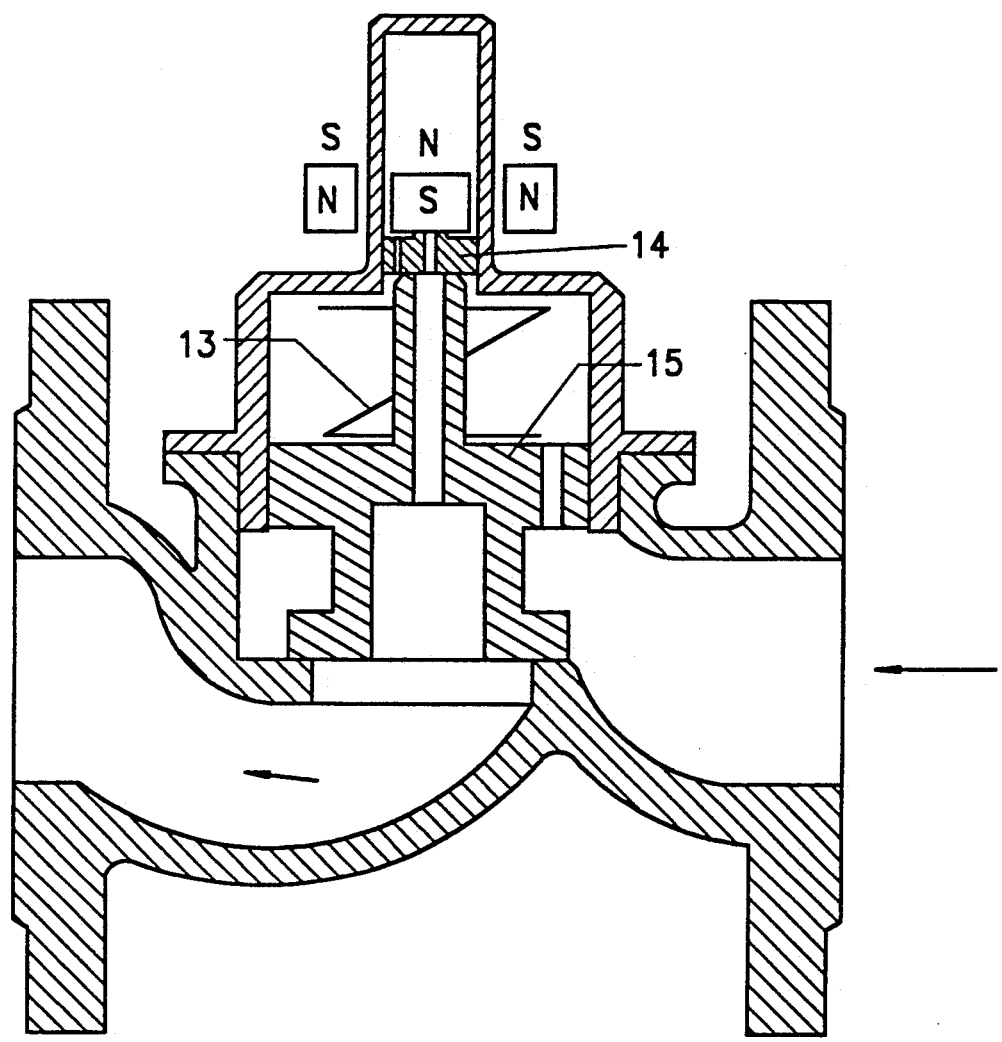
FIG. 2 is a schematic drawing of a large size stop valve according to the present invention.

FIG. 2 shows a large size stop valve in the closed position. It is constructed on the basis of a small size stop valve with one or two stages of large plungers superposed thereon. The small plunger 14 now serves as the stopper of the pressure relief aperture of the large plunger 15. The operating principle is identical to that of the small size stop valve. A spring 13 is provided for lateral mounting and upside down mounting of the valve, as well as for the situation when there exists no pressure in the pipeline.

Figures 3, 4:
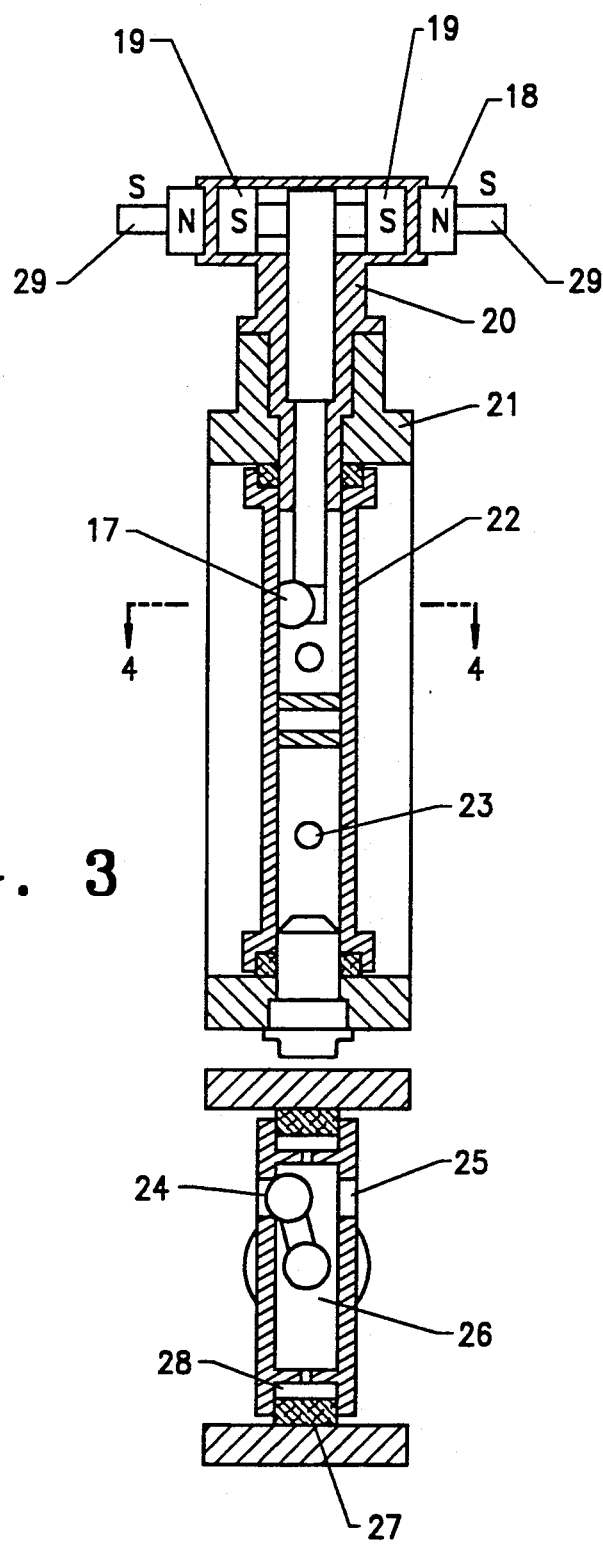
FIG. 3 is a schematic drawing of a magnetic-controlled butterfly valve according to the present invention.
FIG. 4 is a sectional view taken along line 4—4 of FIG. 3.

FIGS. 3 and 4 shows a butterfly valve in the closed position. When the valve is to be opened, the operating knob 29, provided with an external magnetic ring or block 18, should be rotated counterclockwise. This induces, through magnetic force, the internal magnetic ring or block 19, provided in the sealed disk-like guide bushing 20, to rotate the connecting rod 17, which is provided with a stopper element. The rod 17 is rotated counterclockwise to open the pressure relief aperture 24 in the valve plate 22 and to close the back pressure aperture 25. The fluid contained in the back pressure area 26 in the interior cavity of the valve plate 22 will then be discharged through the pressure relief aperture 24. Since the groove 28 accommodating an expandable packing ring 27, is kept in fluid communication with the interior cavity of the valve plate 22 through the through hole 23, and since the pressure intensity of the back pressure area 26 within the interior cavity of the valve plate is less than that of the positive pressure area, the expandable packing ring 27, accommodated in the groove 28, will shrink on the pressure differential between the positive and back pressures. There will be no friction existing between the valve plate assembly 22 and the interior wall of the valve body 21. The connecting rod 17 together with its stopper element continues to urge the valve plate assembly 22 to rotate counterclockwise to thereby open the fluid passage in the valve body 21.

When the butterfly valve is to be closed, the operating knob 29 should be rotated clockwise. The internal magnetic ring or block 19 is actuated by the magnetic force of the external magnet or block 18 to rotate the connecting rod 17 together with its stopper element clockwise to open the back pressure aperture 25 and to close the pressure relief aperture 24. The connecting rod 17 together with its stopper element continues to urge the valve plate assembly 22 to rotate clockwise. When the valve plate assembly 22 approaches the closed position, the fluid flowing through the back pressure aperture 25 in the valve plate 22 into the back pressure area 26 within the interior cavity of the valve plate assembly 22 establishes a back pressure therein. This acts directly through the through hole 23 on the expandable packing ring 27 to pressure it against the interior wall of the valve body 21 to thereby close the fluid passage therein.

A worm and gear means may be provided between the internal magnetic ring or block and the connecting rod to provide a transmission in the magnetic-controlled butterfly valve of extra large dimensions, in order to reduce the dimensions of the permanent magnets and to facilitate manipulation.

Although certain embodiments of the invention have been described herein in detail, the invention is not to be limited only to such embodiments, but rather only by the appended claims.

What is claimed is:

1. A magnet-controlled valve for fluid pipelines comprising: a sealed disk-like guide bushing accommodating an external magnet ring rotatable along the outer wall surface thereof and an internal magnet ring rotatable therein, said internal magnet ring being connected with a connecting rod provided with a stopper element rotatable therewith, and a valve body accommodating a hollow valve plate provided with pressure relief aperture, back pressure aperture and a through hole, said valve plate provided with a peripheral groove for accommodating an expandable packing ring, said connecting rod being inserted into the interior cavity of said valve plate and arranged with its stopper element to be in registry with and engaged with said pressure relief aperture and said back pressure aperture on the two side walls of said valve plate, said through hole provided on the peripheral wall of the valve plate establishing fluid communication between a back pressure area in the interior cavity of said valve plate and the peripheral groove, an expandable packing ring being provided therein.

2. A magnet-controlled valve for fluid pipelines according to claim 1, wherein said external magnet ring and said internal magnet ring are composed of a permanent magnet.

3. A magnet-controlled valve for fluid pipelines according to claim 1, wherein said valve is a butterfly valve.

* * * * *